United States Patent [19]

Henton et al.

[11] Patent Number: 5,055,525
[45] Date of Patent: Oct. 8, 1991

[54] LOW TEMPERATURE TOUGHENED THERMOPLASTIC POLYMER BLEND COMPOSITIONS

[75] Inventors: David E. Henton; F. Michael Plaver; Duane M. Naeger, all of Midland, Mich.; Robert S. Drzal, Naugatuck, Conn.

[73] Assignee: The Dow Chemical Company, Midland, Mich.

[21] Appl. No.: 484,156

[22] Filed: Feb. 23, 1990

[51] Int. Cl.$^5$ .................. C08L 55/02; C08L 75/06
[52] U.S. Cl. ........................... 525/66; 525/942
[58] Field of Search .................... 525/66, 942

[56] References Cited

U.S. PATENT DOCUMENTS

| | | | |
|---|---|---|---|
| 3,970,717 | 7/1976 | Muller-Albrecht et al. | 525/66 |
| 3,984,607 | 10/1976 | Thoma et al. | 525/130 |
| 4,251,642 | 2/1981 | Tan et al. | 525/66 |
| 4,305,981 | 12/1981 | Muroi et al. | 428/31 |
| 4,317,890 | 3/1982 | Goyert et al. | 525/66 |
| 4,980,417 | 12/1990 | Biglione et al. | 525/130 |

FOREIGN PATENT DOCUMENTS 0192230  7/1989  European Pat. Off. .

OTHER PUBLICATIONS

"Modern Plastics Encyclopedia", Mid-Oct. 1989, vol. 66, No. 11, p. 102.

*Primary Examiner*—John C. Bleutge
*Assistant Examiner*—Thomas Hamilton, III
*Attorney, Agent, or Firm*—James B. Guffey

[57] ABSTRACT

Polymer blend compositions having an advantageous combination of low temperature toughness, solvent resistance, scratch resistance and paintability comprise from about 19 to about 64 weight percent of a mass, solution, mass/suspension or mass/solution polymerized rubber modified monovinylidene aromatic/ethylenically unsaturated nitrile polymer; from about 35 to about 80 weight percent of certain selected polyester-based elastomeric thermoplastic polyurethane ingredients; and from about 1 to about 30 weight percent of a relatively high rubber content emulsion polymerized rubber modified graft copolymer ingredient. The resulting polymer blend compositions are especially well suited for use in the preparation of molded articles intended for use in relatively low temperature environments including, for example, in various motor vehicle and/or recreational vehicle applications, as freezer and refrigerator liners, snow removal equipment housings or accessories, and the like.

20 Claims, No Drawings

LOW TEMPERATURE TOUGHENED THERMOPLASTIC POLYMER BLEND COMPOSITIONS

BACKGROUND OF THE INVENTION

The present invention pertains generally to polymer blend compositions comprising certain rubber modified monovinylidene aromatic copolymer compositions in combination with particular proportions of certain selected elastomeric thermoplastic polyurethane ingredients. Such polymer blend compositions are especially well suited for use in various extrusion compounding, injection molding, blow molding and sheet extrusion/thermoforming operations to manufacture a wide variety of fabricated utilitarian articles.

The general concept of blending urethane polymers and butadiene rubber modified styrene acrylonitrile (ABS) polymers is disclosed in U.S. Pat. No. 3,049,505. Other U.S. Patents which deal generally with the subject of blends of polyurethane materials with thermoplastic polymer ingredients such as ABS resins include U.S. Pat. No. 4,317,890 which is concerned with blends comprising from 75 to 97 weight percent of a thermoplastic polyurethane in combination with from 3 to 25 weight percent of a relatively lightly grafted graft copolymer and U.S. Pat. No. 4,342,847 which is directed to a method for producing blends of thermoplastic polyurethanes with other thermoplastic materials by way of an in-situ polymerization/blending process wherein from 35 to 96 parts by weight of the polyurethane ingredient is polymerized in an extruder and in the presence of from 4 to 65 parts by weight of a previously formed thermoplastic polymer ingredient. Carter U.S. Pat. No. 4,179,479 is also concerned with thermoplastic polyurethane compositions optionally containing as much as about 60 weight percent of various other thermoplastic polymer ingredients such as emulsion polymerized ABS compositions, polyoxymethylenes, polycarbonate, etc.

Additional references dealing with the subject of polymer blend compositions containing rubber modified thermoplastics such as ABS resins in combination with various urethane polymer ingredients include published Japanese patent application numbers J51-126,245-A; J60-067,219-A and J61-152,760-A.

SUMMARY OF THE INVENTION

It has now been discovered that polymer blend compositions having a particularly desirable and advantageous combination of properties such as, for example, excellent low temperature toughness, solvent resistance, scratch resistance and paintability can be suitably provided in the form of compositions comprising one or more rubber modified mass, solution, mass/suspension or mass/solution polymerized monovinylidene aromatic graft copolymer ingredients in combination with certain selected elastomeric thermoplastic polyurethane materials and with certain emulsion polymerized rubber modified graft copolymer ingredients. Accordingly, the present invention in one of its aspects is a polymer blend composition comprising from about 19 to about 64 weight percent of one or more rubber modified mass, solution, mass/suspension or mass/solution polymerized monovinylidene aromatic/ethylenically unsaturated nitrile copolymers: from about 35 to about 80 weight percent of one or more elastomeric polyester-based thermoplastic polyurethanes having a polyester-based soft segment content of at least about 50 weight percent on a thermoplastic polyurethane weight basis and having a Shore Hardness rating of less than 90 on the A scale; and from about 1 to about 30 weight percent of one or more emulsion polymerized grafted rubber concentrate (GRC) ingredients.

As used herein, the term "soft segment" refers to the relatively high molecular weight glycol or "macroglycol" constituent employed in the preparation of the elastomeric thermoplastic polyurethane ingredient hereof. The term "polyester-based" as used herein in connection with the polyurethane soft segment description is intended to connote the fact that said soft segment is at least predominantly (i.e., greater than 50 percent on a soft segment weight basis) composed of ester linked macroglycol repeating units, with the remainder of said repeating units (if any) typically being ether linked repeating units. Preferably, said polyurethane soft segment is exclusively (i.e., 100%) or almost exclusively (e.g., 75 percent or more, preferably 85 or 90 percent or more) composed of the indicated ester linked macroglycol repeating units.

In one of its especially preferred embodiments, the subject polymer blend composition employs as its rubber modified mass, solution, mass/suspension or mass/solution polymerized monovinylidene aromatic/ethylenically unsaturated nitrile graft copolymer ingredient one which comprises (a) a graft copolymer comprising, in polymerized form and on a graft copolymer weight basis, from about 55 to about 99 weight percent of a monovinylidene aromatic monomer and from about 1 to about 45 weight percent of an ethylenically unsaturated nitrile monomer, said graft copolymer being grafted to a rubbery substrate polymer: and (b) a matrix polymer comprising, in polymerized form and on a matrix polymer weight basis, from about 55 to about 99 weight percent of a monovinylidene aromatic monomer and from about 1 to about 45 weight percent of an ethylenically unsaturated nitrile monomer.

The indicated polymer blend compositions are characterized as having a continuous phase of the indicated elastomeric thermoplastic polyurethane ingredient and either a co-continuous or dispersed phase containing the rubber modified mass, solution, mass/suspension or mass/solution polymerized monovinylidene aromatic copolymer ingredient and the emulsion polymerized grafted rubber concentrate ingredient. Such blend compositions have exceptionally good low temperature impact strength characteristics and are particularly well suited for use in the manufacture of molded articles intended for use in relatively low temperature environments such as, for example, in motor vehicle and recreational vehicle applications, as freezer and refrigerator liners, as snow removal equipment housings and accessories and the like.

DETAILED DESCRIPTION OF THE INVENTION

Rubber modified mass, solution, mass/suspension or mass/solution polymerized monovinylidene aromatic/ethylenically unsaturated nitrile graft copolymers (hereinafter collectively referred to as "mass polymerized" monovinylidene aromatic copolymers) suitable for use herein have discrete rubbery polymer particles dispersed therein, which particles serve as substrates having grafted thereto a portion of the monovinylidene aromatic copolymer as a grafted superstrate and the remainder of said monovinylidene aromatic copolymer constitutes a continuous matrix phase in which the indicated grafted rubbery particles are dispersed. The matrix phase of such copolymers typically constitutes from about 40 to about 95 (preferably from about 60 to about 80) percent of the overall weight of the indicated rubber-modified compositions and the grafted copolymer constituents constitutes the remainder thereof. Typically the grafted copolymer constituent will have a grafted superstrate to graftable rubber substrate ratio (i.e., a graft to rubber or "G/R" ratio) of from about 0.1:1 to about 2:1 (preferably from about 0.25:1 to about 0 8:1). The dispersed rubbery polymer particles within such copolymers will typically have an overall volume average particle size of from about 0.02 to about 10 (preferably from about 0.05 to about 5) microns.

In certain preferred embodiments hereof, the dispersed rubbery polymer particles of the indicated mass polymerized monovinylidene aromatic graft copolymer are of a sort which have a bimodal particle size distribution in which the indicated rubbery particles are largely composed (e.g., from about 40 to about 90, preferably from about 50 to about 75, weight percent on a total rubbery particle weight basis) of particles having a particle size of less than 0.5 micron (preferably from about 0.05 to about 0.45 micron) and wherein the remainder of said rubbery particles (e.g., from 10 to about 60, preferably from 25 to about 50, weight percent thereof) have a particle size of about 0.5 micron or greater (preferably from about 0.5 to about 5 micron).

Monovinylidene aromatic monomers suitable for use in the aforementioned rubber-modified monovinylidene aromatic/ethylenically unsaturated nitrile copolymers include styrene, alkyl substituted styrenes such as alpha-alkyl-styrene (e.g., alpha-methylstyrene, alpha-ethylstyrene etc.), various ring-substituted styrenes such as ortho or para-methylstyrene, ortho-ethylstyrene, 2,4-dimethylstyrene, etc., ring-substituted halo-styrenes such as chloro-styrene, 2,4-dichloro-styrene, etc. and the like. Such monovinylidene aromatic monomer (especially styrene) typically constitutes from about 55 to about 99 weight percent of said monovinylidene aromatic copolymer and preferably constitutes from about 60 to about 95 (more preferably from about 65 to about 90) weight percent thereof. Such monovinylidene aromatic copolymers are typically normally solid, hard (i.e., non-elastomeric) materials having a glass transition temperature in excess of 25° C.

Suitable ethylenically unsaturated nitrile monomer ingredients for use, typically as a minor constituent in (i.e., constituting from about 1 to about 45, preferably from 5 to 40 and more preferably from 10 to 35, weight percent of) the indicated monovinylidene aromatic copolymers include acrylonitrile, methacrylonitrile, ethacrylonitrile, fumaronitrile, etc.

The indicated rubber modified monovinylidene aromatic copolymers can also optionally contain additional monomer ingredients, typically in relatively minor proportions such as, for example, from about 1 to about 25 (preferably from about 2 to about 15) weight percent on a rubber modified monovinylidene aromatic copolymer weight basis. Examples of such suitable optional monomer ingredients include ethylenically unsaturated anhydrides such as maleic anhydride; ethylenically unsaturated amides such as acrylamide, methacrylamide, etc.; esters (especially lower, e.g., $C_1$-$C_6$, alkyl esters) of ethylenically unsaturated carboxylic acids such as methyl methacrylate, ethylacrylate, hydroxyethylacrylate, n-butyl acrylate or methacrylate, 2-ethyl-hexylacrylate, etc.; ethylenically unsaturated dicarboxylic acid imides such as N-alkyl or N-aryl maleimides such as N-phenyl maleimide, etc.; and the like.

In those instances wherein it is desired to impart enhanced elevated temperature resistance (i.e., heat resistance) to the subject polymer blend compositions, it is generally preferred to employ as the requisite rubber modified mass polymerized monovinylidene aromatic copolymer ingredient one which further comprises, at least in the monovinylidene aromatic copolymer matrix portion thereof and in polymerized form, from about 2 to about 35 (preferably from about 5 to about 25 weight percent (on a matrix copolymer weight basis) of an N-aryl maleimide monomer ingredient such as for example, N-phenyl maleimide, N-(4-diphenyl) maleimide, N-naphthyl maleimide, N-(lower alkyl-substituted phenyl maleimides, N-(lower alkyl-substituted phenyl) maleimides, N-(halo-substituted phenyl) maleimides, and the like. Especially preferred for such usage is N-phenyl maleimide and it can be further noted that any of the various indicated N-aryl maleimide monomers can also be beneficially utilized (again typically in a relatively minor proportion on a by weight basis) as an optional comonomer within the grafted monovinylidene aromatic copolymer superstrate portion of the indicated mass polymerized monovinylidene aromatic copolymer ingredient.

Preferably, the matrix phase portion of the above-described mass polymerized monovinylidene aromatic copolymer has a solubility parameter of from about 9.0 to about 10.2 (preferably from about 9.2 to about 10.0) as calculated pursuant to the method described in *Polymer Blends*, Academic Press, pp. 45–48, 1978, edited by D. R. Paul and S. Newman.

Suitable rubbery polymer materials for use as the dispersed rubbery particles both within the mass polymerized rubber modified monovinylidene aromatic copolymer constituent hereof and within the emulsion polymerized grafted rubber concentrate ingredient hereof include homopolymers of 1,3-conjugated alkadiene monomers; copolymers of from about 60 to about 99 weight percent of said 1,3-conjugated alkadienes with from about 1 to about 40 weight percent of one or more monoethylenically unsaturated monomers such as, for example, monovinylidene aromatic monomers (e.g., styrene, etc.), and ethylenically unsaturated nitriles such as acrylonitrile, methacrylonitrile, etc., alkyl acrylate or methacrylate monomers such as methyl methacrylate and the like; ethylene/propylene copolymer rubbers and rubbery ethylene/propylene/non-conjugated diene copolymers; rubbery acrylate homopolymers and copolymers; and the like. Especially preferred rubbery copolymers for use herein include polymers composed of from about 60 to 100 weight percent of 1,3-butadiene and from 0 to about 40 weight percent of styrene or acrylonitrile. Typically, the indicated rubbery polymer materials are of a sort which have a glass transition temperature of −20° C. or lower and, preferably, said materials have a glass transition temperature of −30° C. or lower.

While not being particularly critical for the purposes of the present invention, it can nonetheless be noted that the mass polymerized rubber modified monovinylidene aromatic copolymers employed herein will typically comprise from about 1 to about 35 (preferably from about 5 to about 25) weight percent of the above-discussed dispersed rubbery polymer particles. The emulsion polymerized grafted rubber concentrate ingredient hereof will typically have a dispersed rubber polymer content of from about 35 to about 85 (preferably from about 40 to about 85 and most preferably from about 45 to about 80) weight percent on a grafted rubber concentrate weight basis.

The aforementioned mass polymerized monovinylidene aromatic graft copolymer hereof can suitably be prepared by way of any convenient conventional mass, solution, mass/suspension or mass/solution graft polymerization process conducted in the presence of the desired rubbery polymer material.

Suitable grafted rubber concentrate ingredients for use herein include relatively high rubber content emulsion polymerized graft copolymer ingredients wherein the grafted superstrate polymer thereof is a monovinylidene aromatic/ethylenically unsaturated nitrile copolymer of the sort which has hereinbefore been more fully discussed and described in connection with the mass polymerized graft copolymer ingredient hereof. Also suitable for use as the grafted rubber concentrate ingredient herein are those wherein the grafted superstrate polymer is different from the above discussed monovinylidene aromatic/unsaturated nitrile copolymer and thus include those rubber concentrate ingredients wherein the grafted superstrate polymer is an acrylate or methacrylate polymer such as polymethyl methacrylate, the various methyl methacrylate copolymers and the like. Such grafted rubber concentrate compositions can be conveniently prepared in accordance with the various well known emulsion graft polymerization methods and techniques and are also available commercially, for example, from Rohm and Haas as Paraloid ® EXL-3607 which is a polymethylmethacrylate grafted butadiene rubber material.

While not being particularly critical, it is generally desirable to employ a predominant proportion (e.g., from about 50 to about 95, preferably from about 60 to about 90, weight percent) of the indicated mass polymerized rubber modified monovinylidene aromatic copolymer ingredient in combination with a minor proportion (e.g., from about 5 to about 50, preferably from about 10 to about 40, weight percent) of the indicated relatively high rubber content emulsion polymerized rubber modified graft copolymer ingredient said weight percentages being based only upon the combined weight of the two different types of rubber-modified graft copolymer ingredients. The dispersed rubbery particles associated with the emulsion polymerized graft copolymer ingredient will typically have an overall volume average particle size of from about 0.03 to about 1.5 (preferably from about 0.05 to about 0.8) micron and will constitute from about 10 to about 90 (preferably about 20 to about 80) weight percent of the total dispersed rubbery polymer particle content within the rubber modified monovinylidene aromatic copolymer in question. The particle size distribution of said emulsion polymerized graft copolymer particles can be mono-modal or can, if desired in a particular instance, be of a bimodal or multi-modal character. The dispersed rubbery polymer particles of the mass polymerized component will typically have a volume average particle size of from about 0.4 to about 6 (preferably from about 0.7 to about 5) microns; will generally constitute from about 10 to about 90 (preferably from about 20 to about 80) weight percent of the total dispersed rubbery polymer particle content therein; and can also be of a monomodal, bimodal or multimodal particle size distribution.

As has been noted above, the above-described mass polymerized monovinylidene aromatic graft copolymer ingredient typically constitutes from about 19 to about 64 weight percent of the subject polymer blend compositions. In preferred instances, however, said ingredient constitutes from about 20 to about 60 (more preferably from about 35 to about 55) weight percent of such compositions. The emulsion polymerized grafted rubber concentrate typically constitutes from 1 to about 30 weight percent of the subject polymer blends and preferably constitutes from about 5 to about 20 or 25 weight percent thereof.

In contrast to the various prior art rubber modified monovinylidene aromatic copolymer/thermoplastic polyurethane blend compositions wherein the nature of the polyurethane ingredient employed is apparently not particularly critical for the purposes contemplated therein, it has been found for the purpose, and in the context, of the present invention to be essential that the elastomeric thermoplastic polyurethane employed be a polyester-based material prepared from a diisocyanate; a polyester soft segment or "macroglycol" component predominantly composed of polyester (especially polycaprolactone) repeating units; and a chain extender. More specifically, it has been found that the nature and amount of the thermoplastic polyurethane's soft segment is critical in order to obtain the desired low temperature (e.g., −20° F. or below) toughness properties within the subject polymer blends and, in particular, that only thermoplastic polyurethanes containing at least about 50 weight percent of a polyester-based soft segment on a polyurethane weight basis impart the desired level of low temperature toughness to the resulting polymer blends. In this connection, it has also been found that polyether-based polyurethanes (i.e., wherein 50 weight percent or more of the soft segment content is composed of ether linked repeating units), and even polyester-based polyurethanes having Shore A hardness of 90 or more, result in low temperature toughness characteristics which are unacceptable for the present invention's purposes.

An especially preferred group of polyester-based elastomeric thermoplastic polyurethanes for use in the present invention include those which are the reaction products of: (i) 4,4'methylenebis(phenyl isocyanate); (ii) polycaprolactone or a polyester of adipic acid and a glycol having at least one primary hydroxyl group (especially polycaprolactone soft segment polyols); and (iii) a relatively low molecular weight difunctional chain extender having 2 active hydrogen-containing groups which are reactive with isocyanate groups.

In preparing an adipic acid-based polyester polyol soft segment, the adipic acid is condensed with a suitable glycol or mixture of glycols which have at least one primary hydroxyl group. The condensation is stopped when an acid number of from about 0 5 to about 2.0 is reached. The water formed during the reaction is removed simultaneously therewith or subsequently thereto such that the final water content is from about 0.01 to about percent 0.2, preferably from about 0 01 to 0.05 percent.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol up to about 1 percent may be used along with the glycols such as, for example, trimethylolpropane, glycerine, hexanetriol and the like. The resulting hydroxyl polyester has a molecular weight of at least about 500, a hydroxyl number of about 25 to about 190 and preferably between about 40 and about 60, and an acid number of between about 0.5 and about 2 and a water content of 0 01 to about 0.2 percent.

Suitable chain extending agents for use in preparing the polyester-based elastomeric thermoplastic polyurethanes for use herein include any difunctional compounds containing two active hydrogen-containing groups which are reactive with isocyanate groups. Examples of such suitable chain extending agents thus include diols including ethylene glycol, propylene glycol, butylene glycol, 1,4-butanediol, butenediol, butynediol, xylylene glycols, amylene glycols, 1,4-phenylene-bis-$\beta$-hydroxyethyl ether, 1,3-phenylene-bis-$\beta$-hydroxy ethyl ether, bis-(hydroxy-methyl-cyclohexane), hexanediol, thiodiglycol and the like; diamines including ethylene diamine, propylene diamine, butylene diamine, hexamethylene diamine, cyclohexalene diamine, phenylene diamine, tolylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. If desirable, a small amount of trifunctional or higher polyfunctional material may be utilized. Such polyfunctional chain extender, however, should not be present in an amount greater than about 1 percent by weight. Any suitable polyfunctional compound may be used for such purpose such as, for example, glycerine, trimethylolpropane, hexanetriol, pentaerythritol and the like.

Although thermoplastic polyurethanes based upon polycaprolactone or adipate polyesters are generally preferred for use herein, other polyester-based thermoplastic polyurethanes can also be suitably employed within the present invention such as, for example, those in which there is employed (in place of the adipic acid) succinic acid, suberic acid, sebacic acid, oxalic acid, methyl adipic acid, glutaric acid, pimelic acid, azelaic acid, phthalic acid, terephthalic acid, isophthalic acid and the like as well as those prepared using hydroxycarboxylic acids such as 3-hydroxy-butyric acid in place of the adipic acid or caprolactone component.

While 4,4'-methylene bis (phenyl isocyanate) is an especially preferred diisocyanate species for use in preparing the elastomeric polyurethane ingredients for use herein, other diisocyanate which can be noted as also being suitable for such purpose include ethylene diisocyanate, ethylidene diisocyanate, propylene diisocyanate, butylene diisocyanate, cyclopentylene-1,3-diisocyanate, cyclohexylene-1,4-diisocyanate, 2,6-tolylene diisocyanate, 2,2-diphenylpropane-4,4'-diisocyanate, P-phenylene diisocyanate, m-phenylene diisocyanate, xylylene diisocyanate, 1,4-naphtylene diisocyanate, 1,5-naphthylene diisocyanate, diphenyl-4,4'-diisocyanate, azobenzene-4,4'diisocyanate, diphenyl sulfone4,4'diisocyanate, dichlorohexamethylene diisocyanate, tetramethylene diisocyanate, pentamethylene diisocyanate, hexamethylene diisocyanate, 1-chlorobenzene-1,4-diisocyanate, furfurylidene diisocyanate and the like.

The aforementioned types of polyester-based thermoplastic polyurethanes are generally known materials. Suitable methodology for the preparation thereof is disclosed within Column 7 of U.S. Pat. No. 4,665,126 and is incorporated herein by reference.

As has been noted above, the polyester-based thermoplastic polyurethanes suitable for use herein are those which have a Shore A Hardness of less than 90 as determined pursuant to ASTM D2240 and those which are particularly preferred for use herein have a Shore A Hardness of about 85 less or (especially about 80 or less) as determined pursuant to the same standard test method.

It can also be noted that such polyester-based elastomeric polyurethanes typically employ a polyester polyol soft segment component having a molecular weight of from about 500 to about 5,000 (preferably from about 1,000 to about 3,000) and that such soft segment generally constitutes at least about 50 (preferably from about 55 to about 75) percent of the total weight of the resulting polyester-based thermoplastic polyurethane ingredient.

It is also generally preferred that the elastomeric thermoplastic polyurethanes employed herein be of a sort wherein the polyester-based soft segment thereof has a solubility parameter of from about 8.7 to about 10.2 (preferably from about 9.0 to about 10) cal$^{1/2}$/mole cm$^{3/2}$ as calculated pursuant to the method identified hereinbefore in connection with the monovinylidene aromatic copolymer ingredient. It is also generally preferred that the ratio of the aforementioned monovinylidene aromatic copolymer matrix phase solubility parameter to that of the thermoplastic polyurethane soft segment be from about 1.00:0.88 to about 1.00:1.17, preferably from about 1.00:0.92 to about 1.00:1.11.

Typically, the amount of the above-described thermoplastic polyurethane ingredient employed within the subject polymer blend compositions is from about 35 to about 80 weight percent on a total composition weight basis. Preferred compositions hereof include those wherein said thermoplastic polyurethane ingredient constitutes from about 40 to about 75 (more preferably from about 40 to about 60) weight percent of the indicated polymer blend compositions.

Methods suitable for the preparation of the subject polymer blend compositions include conventional extrusion compounding techniques utilizing separately prepared rubber modified monovinylidene aromatic copolymer and thermoplastic polyurethane ingredients and also include simultaneous compounding/polymerization techniques of the sort described in U.S. Pat. No. 4,342,847 wherein the thermoplastic polyurethane is polymerized in-situ within an extruder and in the presence of the rubber modified monovinylidene aromatic copolymer ingredient.

The polymer blend compositions hereof can also optionally contain additional conventional additives of ingredients such as lubricants, stabilizers, dyes, pigments, organic or inorganic fillers or fibers and the like.

The resulting polymer blend compositions hereof are useful in the preparation of a wide variety of injection molded or thermoformed thermoplastic articles. However, due to the excellent low temperature toughness characteristics of such compositions, they are especially well suited for various motor vehicle, outdoor recreational and/or appliance applications which involve periodic exposure to or prolonged periods of use at relatively low ambient temperatures.

The present invention is further understood and illustrated by reference to the following examples thereof in which all parts and percentages are on a weight basis unless otherwise indicated.

EXAMPLES 1 and 2

In this series of experiments three different ABS/-TPU polymer blend compositions are extrusion compounded and are subjected to physical property testing. The compositions of Examples 1 and 2 contain 13 weight percent of two different emulsion polymerized grafted rubber concentrate compositions in addition to the mass polymerized ABS and the TPU ingredients. The Experiment A composition contains only the mass polymerized ABS component in combination with the TPU ingredient. The compositional details of the resulting polymer blends along with the heat distortion, heat sag and notched izod impact characteristics thereof are set forth in Table I.

TABLE I

| Sample | Composition (Weight Percent) | DTUL[3] (°F.) at 66 psi | Heat Sag[6] (in) 185° F. | Notched Izod[7] (ft-lb/in) −20° F. |
|---|---|---|---|---|
| Example 1 | 48% ABS-1[1]<br>39% TPU-1[2]<br>13% PMMA-GRC[3] | 162 | 0.394 | 9.9[9] |
| Example 2 | 48% ABS-1<br>39% TPU-1<br>13% SAN-GRC[4] | 170 | 0.276 | 12.6[9] |
| Experiment A | 55% ABS-1<br>45% TPU-1 | 165 | 0.335 | 8.4[8] |

[1]ABS-1 = A mass/solution polymerized ABS containing 12 percent of an anionically polymerized butadiene rubber, 25 percent acrylonitrile and 63 percent styrene. Rubber particle size is 0.7 microns (volume average).

[2]TPU-1 = A polyester-based elastomeric polyurethane having a Shore A Hardness rating of 80 and containing 60.1 weight percent of a caprolactone soft segment having a molecular weight of 2,000 and a solubility parameter of 9.2 cal$^{1}$/mole cm$^{3/2}$.

[3]PMMA-GRC = An emulsion graft polymerized butadiene rubber concentrate having a polymethyl methacrylate superstrate graft polymerized to a butadiene rubber substrate and having a volume average rubber particle size of 0.1μ, a graft to rubber ratio of 0.3 and a rubber content of about 70 weight percent.

[4]SAN-GRC = An emulsion graft polymerized butadiene rubber concentrate having a styrene/acrylonitrile copolymer superstrate grafted to the butadiene rubber substrate and having a volume average rubber particle size of 0.1μ, a graft to rubber ratio of 0.3 and a rubber content of 51 weight percent.

[5]Distortion temperature under load as per ASTM D-645 at 66 psi using unannealed 0.125 inch thick × 0.5 inch wide test specimens.

[6]Sag in inches after 30 minutes at 185° F. using a 0.125 inch thick tensile bar and a 4.5 inch overhang.

[7]ASTM D-256

[8]40 percent brittle breaks and 60 percent ductile breaks.

[9]100% ductile breaks.

As can be seen from the Table I results, the emulsion polymerized grafted rubber concentrate-containing compositions hereof have excellent low temperature (i.e., −20° F.) notched izod impact strength.

EXAMPLES 3–10

In this series of experiments, an N-phenyl maleimide-modified mass polymerized ABS composition containing 19.7 weight percent of the emulsion polymerized SAN-GRC rubber concentrate material of Example 2 is extrusion compounded with varying proportions of various different polyester-based thermoplastic polyurethane ingredients having different types and different relative amounts of polyester polyol soft segments and having different Shore Hardness ratings. The compositional details and the Notched Izod impact strengths of the resulting compositions at various temperatures are set forth in Table II. Also set forth in Table II are comparative compositions which employ either polyether-based thermoplastic polyurethanes or polyester-based thermoplastic polyurethanes having Shore Hardness values that are too high for the purposes of the present invention or which employ the requisite type (i.e., in terms of Shore Hardness) of polyester-based thermoplastic polyurethane ingredient but in a proportion which is too low for the present invention's purposes.

The specific polymer ingredients employed in this series of experiments are as follows:

ABS-2 is a blend of 80.3 percent of a mass/solution polymerized styrene/acrylonitrile/N-phenyl-maleimide (66/22/12) ABS containing 7.6 percent of anionically polymerized butadiene rubber (volume average particle size = 2−3μ and gel content = 36 weight percent) and 19.7 weight percent of the emulsion grafted SAN-GRC material of Example 2.

The PMMA-GRC material of Example 8 is as described in footnote 3 of Table 1. The various elastomeric thermoplastic polyurethanes (TPU) ingredients are as set forth in Table A below.

TABLE A

| | Soft Segment (Macroglycol) Chemical Structure | Percent Soft Segment By Wt. | Soft Segment Solubility Parameter |
|---|---|---|---|
| TPU-1 | Polycaprolactone | 60 | 9.2 |
| TPU-2 | Polytetramethylene Glycol Ether | 58 | 8.1 |
| TPU-3 | Polycaprolactone/Poly Propylene Oxide Ether in a 50:50 weight ratio | 60 | 9.2/7.7 |
| TPU-4 | Polybutylene Adipate | 60 | 9.3 |
| TPU-5 | Polycaprolactone | 50 | 9.2 |
| TPU-6 | Polycaprolactone | 67 | 9.2 |
| TPU-7 | Polycaprolactone | 42 | 9.2 |
| TPU-8 | Polycaprolactone | 30 | 9.2 |
| TPU-9 | Polycaprolactone | 39 | 9.2 |

TABLE II

| Sample | Composition (Weight Percent) | TPU Soft Segment Type | TPU Shore Hardness Rating | Notched Izod Impact Strength[1] (ft.-lbs/inch of notch) | | | |
|---|---|---|---|---|---|---|---|
| | | | | Room Temp. | $-10°$ F. | $-20°$ F. | $-30°$ F. |
| Example 3 | 55% ABS-2 45% TPU-1 | Polyester | 80A | — | — | 19.5 | 14.5 |
| Example 4 | 55% ABS-2 45% TPU-4 | Polyester | 80A | — | 19.6 | 9.3 | — |
| Example 5 | 50% ABS-2 50% TPU-1 | Polyester | 80A | No Break | — | 23.8 | 23.0 |
| Example 6 | 20% ABS-2 80% TPU-1 | Polyester | 80A | — | — | — | 27.9 |
| Example 7 | 40% ABS-2 60% TPU-1 | Polyester | 80A | — | — | 32.0 | 31.7 |
| Example 8 | 47% ABS-2 38% TPU-1 15% PMMA-GRC | Polyester | 80A | No Break | — | — | 13.9 |
| Example 9 | 55% ABS-2 45% TPU-6 | Polyester | 75A | — | — | 26.0 | 27.1 |
| Example 10 | 60% ABS-2 40% TPU-1 | Polyester | 80A | — | 17.8 | 13.5** | — |
| Experiment A | 100% ABS-2 | None | — | 4.6 | — | 1.9* | — |
| Experiment B | 55% ABS-2 45% TPU-7 | Polyester | 55D | 10.3 | — | 1.3* | — |
| Experiment C | 55% ABS-2 45% TPU-8 | Polyester | 80D | 1.8* | — | 1.1* | — |
| Experiment D | 80% ABS-2 20% TPU-1 | Polyester | 80A | — | 3.1 | 3.8* | — |
| Experiment E | 55% ABS-2 45% TPU-9 | Polyester | 65D | 1.7* | 0.7* | — | — |
| Experiment F | 55% ABS-2 45% TPU-2 | Polyester | 80A | 12.0 | 7.0 | 3.4* | — |
| Experiment G | 55% ABS-2 45% TPU-3 | 50:50 Mixed Polyether/ Polyester | 80A | 8.2 | 6.0 | 4.7* | — |
| Experiment H | 55% ABS-2 45% TPU-5 | Polyester | 90A | 25.7 | 6.3 | 4.5* | — |

[1] ASMT D-256
*connotes brittle failure mode
**4 Ductile (15.9/Izod Average)/1 Brittle (3.8/Izod)

While the subject matter hereof has been herein described and illustrated by reference to certain specific embodiments and examples thereof, such is not to be in any way interpreted as limiting the scope of the instantly claimed invention.

What is claimed is:

1. A polymer blend composition comprising from about 19 to about 64 weight percent of one or more rubber modified mass, solution, mass/suspension or mass/solution polymerized monovinylidene aromatic/ethylenically unsaturated nitrile graft copolymers which contain from about 1 to about 35 weight percent, on a mass, solution mass/suspension or mass/solution graft copolymer weight basis, of dispersed rubbery polymer particles; from about 35 to about 80 weight percent of one or more polyester-based elastomeric thermoplastic polyurethanes having a polyester-based soft segment content of at least about 50 weight percent on an elastomeric thermoplastic polyurethane weight basis and having a Shore Hardness rating of less than 90 on the A scale; and from 1 to about 30 weight percent of one or more emulsion polymerized grafted rubber concentrate ingredients.

2. The polymer blend composition of claim 1 wherein the mass, solution, mass/suspension or mass/solution polymerized rubber modified monovinylidene aromatic/ethylenically unsaturated nitrile graft copolymer comprises:

(a) a graft copolymer comprising, in polymerized form and on a graft copolymer weight basis, from about 55 to about 99 weight percent of a monovinylidene aromatic monomer and from about 1 to about 45 weight percent of an ethylenically unsaturated nitrile monomer, said graft copolymer being grafted to a rubbery substrate polymer and (b) a matrix polymer comprising, in polymerized form and on a matrix polymer weight basis, from about 55 to about 99 weight percent of a monovinylidene aromatic monomer and from about 1 to about 45 weight percent of an ethylenically unsaturated nitrile monomer.

3. The polymer blend composition of claim 2 wherein the mass, solution, mass/suspension or mass/solution polymerized rubber modified monovinylidene aromatic/ethylenically unsaturated nitrile graft copolymer comprises from about 5 to about 25 weight percent of said rubbery substrate polymer.

4. The polymer blend composition of claim 3 wherein the rubbery substrate polymer is a homopolymer of 1,3-butadiene or a copolymer thereof with up to about 40 weight percent, on a rubbery substrate polymer weight basis, of a comonomer selected from the group consisting of monovinylidene aromatic monomers, ethylenically unsaturated nitrile monomers and alkyl acrylate or methacrylate monomers.

5. The polymer blend composition of claim 1 wherein the emulsion polymerized grafted rubber concentrate constitutes from about 5 to about 25 weight percent thereof.

6. The polymer blend composition of claim 5 wherein the emulsion polymerized grafted rubber concentrate is an emulsion polymerized graft copolymer which comprises dispersed rubbery particles having a volume average particle size of from about 0.03 to about 1 5 micron and wherein the mass, solution, mass/suspension or mass/solution polymerized rubber modified copolymer comprises dispersed rubbery particles having a volume average particle size of from about 0.4 to about 6 microns.

7. The polymer blend composition of claim 1 wherein the thermoplastic polyurethane has a Shore A hardness rating of about 85 or less and has a soft segment content of from about 55 to about 75 weight percent.

8. The polymer blend composition of claim 7 wherein the soft segment of the thermoplastic polyurethane is based upon polycaprolactone.

9. The polymer blend composition of claim 8 wherein the thermoplastic polyurethane is based at least in part upon 4,4'-methylene bis (phenyl isocyanate).

10. The polymer blend composition of claim 1 wherein the thermoplastic polyurethane has a soft segment molecular weight of from about 500 to about 5,000.

11. The polymer blend composition of claim 1 wherein the emulsion polymerized grafted rubber concentrate has a dispersed rubbery polymer content of from about 35 to about 85 weight percent on a grafted rubber concentrate weight basis.

12. The polymer blend composition of claim 11 wherein the grafted polymer superstrate of the emulsion grafted rubber concentrate is a monovinylidene aromatic/ethylenically unsaturated nitrile copolymer or an acrylate or methacrylate polymer.

13. The polymer blend composition of claim 2 wherein the matrix polymer portion of the mass, solution, mass/suspension or mass/solution polymerized monovinylidene aromatic/ethylenically unsaturated graft copolymer has a solubility parameter of from about 9.0 to about 10.2 $cal^{1/2}$/mole $cm^{3/2}$.

14. The polymer blend composition of claim 13 wherein the soft segment of the elastomeric thermoplastic polyurethane has a solubility parameter of from about 8.7 to about 10.2 $cal^{1/2}$/mole $cm^{3/2}$.

15. The polymer blend composition of claim 14 wherein the solubility parameter ratio as between the monovinylidene aromatic/ethylenically unsaturated nitrile graft copolymer matrix polymer and the elastomeric thermoplastic polyurethane soft segment is from about 1.00:0.88 to about 1.00:1.17.

16. The polymer blend composition of claim 1 wherein the polyester-based thermoplastic polyurethane constitutes from about 40 to about 75 weight percent of said polymer blend composition.

17. The polymer blend composition of claim 1 wherein the polyester-based thermoplastic polyurethane constitutes from about 40 to about 60 weight percent of said polymer blend composition.

18. The polymer blend composition of claim 17 wherein the rubber modified mass, solution, mass/suspension or mass/solution polymerized monovinylidene aromatic/ethylenically unsaturated nitrile graft copolymer constitutes from about 35 to about 55 weight percent of said polymer blend composition.

19. The polymer blend composition of claim 18 wherein the emulsion polymerized grafted rubber concentrate ingredient constitutes from about 5 to about 25 weight percent of said polymer blend composition.

20. The polymer blend composition of claim 1 wherein the rubber modified mass, solution, mass/suspension or mass/solution polymerized monovinylidene aromatic/ethylenically unsaturated nitrile graft copolymer constitutes from about 35 to about 55 weight percent of said polymer blend composition.

* * * * *

UNITED STATES PATENT AND TRADEMARK OFFICE
CERTIFICATE OF CORRECTION

PATENT NO. : 5,055,525

DATED : OCTOBER 8, 1991

INVENTOR(S) : DAVID E. HENTON, ET AL.

It is certified that error appears in the above-identified patent and that said Letters Patent is hereby corrected as shown below:

In Column 12, line 38, "substrate polymer and" should correctly appear as "substrate polymer; and".

In Column 12, line 67, "0.03 to about 1 5 micron" should correctly appear as "0.03 to about 1.5 micron".

Signed and Sealed this

Ninth Day of March, 1993

Attest:

STEPHEN G. KUNIN

Attesting Officer

Acting Commissioner of Patents and Trademarks